United States Patent [19]

Mizokawa et al.

[11] 4,398,288

[45] Aug. 9, 1983

[54] LOOP TYPE DATA HIGHWAY SYSTEM FOR DATA TRANSMISSION

[75] Inventors: Sadao Mizokawa; Seiichi Yasumoto; Masahiro Takahashi, all of Ibaraki, Japan

[73] Assignee: Hitachi, Ltd., Tokyo, Japan

[21] Appl. No.: 229,180

[22] Filed: Jan. 27, 1981

[51] Int. Cl.³ .............................................. H04J 3/06
[52] U.S. Cl. ...................................... 370/86; 370/100
[58] Field of Search ................. 370/86, 103, 108, 100; 375/106, 107; 340/825.05; 364/200, 900

[56] References Cited

U.S. PATENT DOCUMENTS

| | | | |
|---|---|---|---|
| 3,651,408 | 3/1972 | Miller | 370/103 |
| 3,863,220 | 1/1975 | Osawa et al. | 340/825.05 |
| 4,064,486 | 12/1977 | Faber | 340/825.05 |
| 4,136,384 | 1/1979 | Okada et al. | 364/200 |

*Primary Examiner*—Douglas W. Olms
*Attorney, Agent, or Firm*—Antonelli, Terry & Wands

[57] ABSTRACT

The periodicity of an input signal is monitored by means of a re-triggerable one-shot multivibrator. When an input signal interruption is detected by the output of the multivibrator, the state of the input signal interruption is held to interrupt the transmission until a phase locked loop is demodulated. The transmission is not opened until the phase locked loop is brought into its synchronous state.

4 Claims, 9 Drawing Figures

LOOP TYPE DATA HIGHWAY SYSTEM FOR DATA TRANSMISSION

BACKGROUND OF THE INVENTION

1. Field of the Invention

The present invention relates to a loop type data highway system, in which some stations are dispersedly distributed in a wide area and are connected into a closed loop through a common bus.

2. Description of the Prior Art

In a data highway system of this kind, it is customary that one of the stations becomes a key station for feeding a reference clock signal to the highway for transmitting and receiving data having a predetermined clock, whereas the remaining stations extract a timing signal from the data signals received so that the clock signals corresponding to the aforementioned reference clock are reproduced for use by a phase locked loop. At each station, the data to be transmitted and received is received and transmitted by being demodulated and modulated by the use of that reference clock. The transmission of the data from one station to another station is performed through the reception and transmission by the stations located on the data highway between the aforementioned two stations.

When a phase locked loop is to be utilized, there can be attained an advantage in that the transmission and reception can be effected without transmitting the clock signal, on which the operations are based, to the stations through another independent transmission line. On the other hand, there results the following disadvantage. Specifically, even when the input signal disappears, a clock signal similar to the normal clock continues to be generated for a predetermined time period. As a result, there is a possibility of generating erroneous received data. Unfortunately, a phase locked loop operates in a so-called "free run oscillation" if it is left in an input signal interrupted state, so that it oscillates at an oscillatory frequency intrinsic to each phase locked loop. In the loop transmission system, moreover, if the transmission data due to the intrinsic oscillatory frequency is transmitted from the station at such a free run oscillation state to a next station, the phase locked loop of each station may effect synchronous extraction due to the dispersion in the characteristics of the constituting parts, the differences in the temperature characteristics or the like by the free run frequency of the phase locked loop of the preceding station. In this case, erroneous received data is also generated.

In order to prevent those erroneous operating states, the following operations are required for the stations from the construction of the system:

(1) At each station, a no input signal condition, if any, is detected as promptly and accurately as possible so that the erroneous operations of the stations are prevented, upon the detection, for example, by supressing the received data.

(2) The no input signal state detected at each station is transmitted without fail so that the system as a whole is prevented from erroneously operating.

As has been disclosed in Japenese Patent Laid-Open No. 52-95104, for example, according to the prior art, there is proposed a concept in which the feeding of the signal to be transmitted is stopped at the station in which the input signal interruption is detected, by the elimination of the periodicity of the input signal thereby to solve the aforementioned problem.

As the speed of the highway system is raised, however, a receiver has a tendency of receiving the input signal in the form of an AC signal using AC coupled amplifiers connected in cascade. This is advantageous in the aspects of the improvements in the frequency responding characteristics of the receiver and the amplification factor for the input signal but is disadvantageous in that each receiver starts its oscillations with its intrinsic frequency within a relatively short time period when the input signal is interrupted.

By simply monitoring the periodicity of the input signal, therefore, as in the aforementioned well known example, the detection of the input signal interruption can not be accomplished when the receiver starts to generate an oscillatory signal having the frequency of the amplifier.

It is also proposed that the asymmetry of a PLL is detected by monitoring the output of a low-pass filter, for example.

However, since the PLL is equipped with a low-pass filter having a high time constant, the period between the no input signal state and the asymmetry of the PLL becomes so long that the detection is accordingly delayed. As a result, the erroneous received data is likewise fed out during that delay period.

SUMMARY OF THE INVENTION

In accordance with the present invention, therefore:
(1) As soon as the input signal interruption is detected, the transmission signal is instantly stopped.
(2) The detection result of the input signal interruption is held for a predetermined period, i.e., for a longer period than that for which it is possible to judge that the phase locked loop is operating with the free run frequency.
(3) The restart of the transmission signal is permitted on the following conditions:
  (a) after the aforementioned period has elapsed;
  (b) there is an input signal; and
  (c) the phase locked loop is judged to be at the synchronous extraction state.

It is, therefore, an object of the present invention to reliably prevent erroneous received data from being fed out in response to the input signal interruption.

Other objects and advantages of the present invention will become apparent from the following description taken in conjunction with the embodiment thereof.

DESCRIPTION OF THE PREFERRED EMBODIMENT

Figure 1:
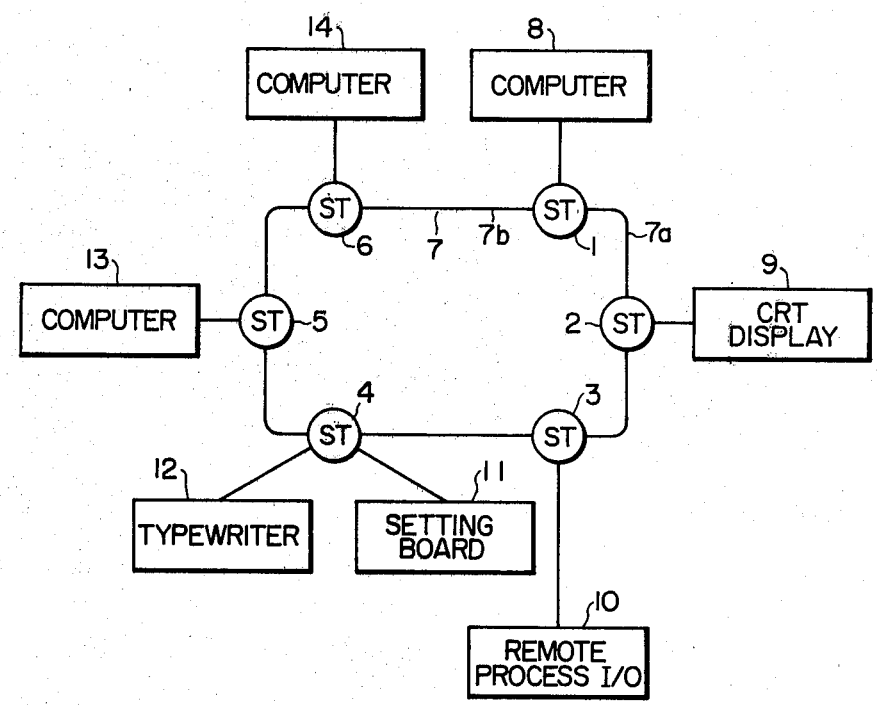
FIG. 1 is a diagram showing one form of the basic arrangement of a loop type data highway system according to the present invention.

Referring to FIG. 1 showing one form of the basic arrangement of a loop type data highway system embodying the present invention, a plurality of stations 1 to 6 form a closed loop by being connected with one another through a common bus 7. A computer 8 is connected to the station 1, and a cathode-ray tube display 9 is connected to the station 2. A remote processing input-output unit 10 is connected to the station 3, and a setting board 11 and a typewriter 12 are connected to the station 4. Computers 13 and 14 are connected to the stations 5 and 6, respectively. These various data processing devices are interconnected through the stations 1 to 6 so that transfer of information can be carried out between any desired two points on the loop.

Figure 2A:
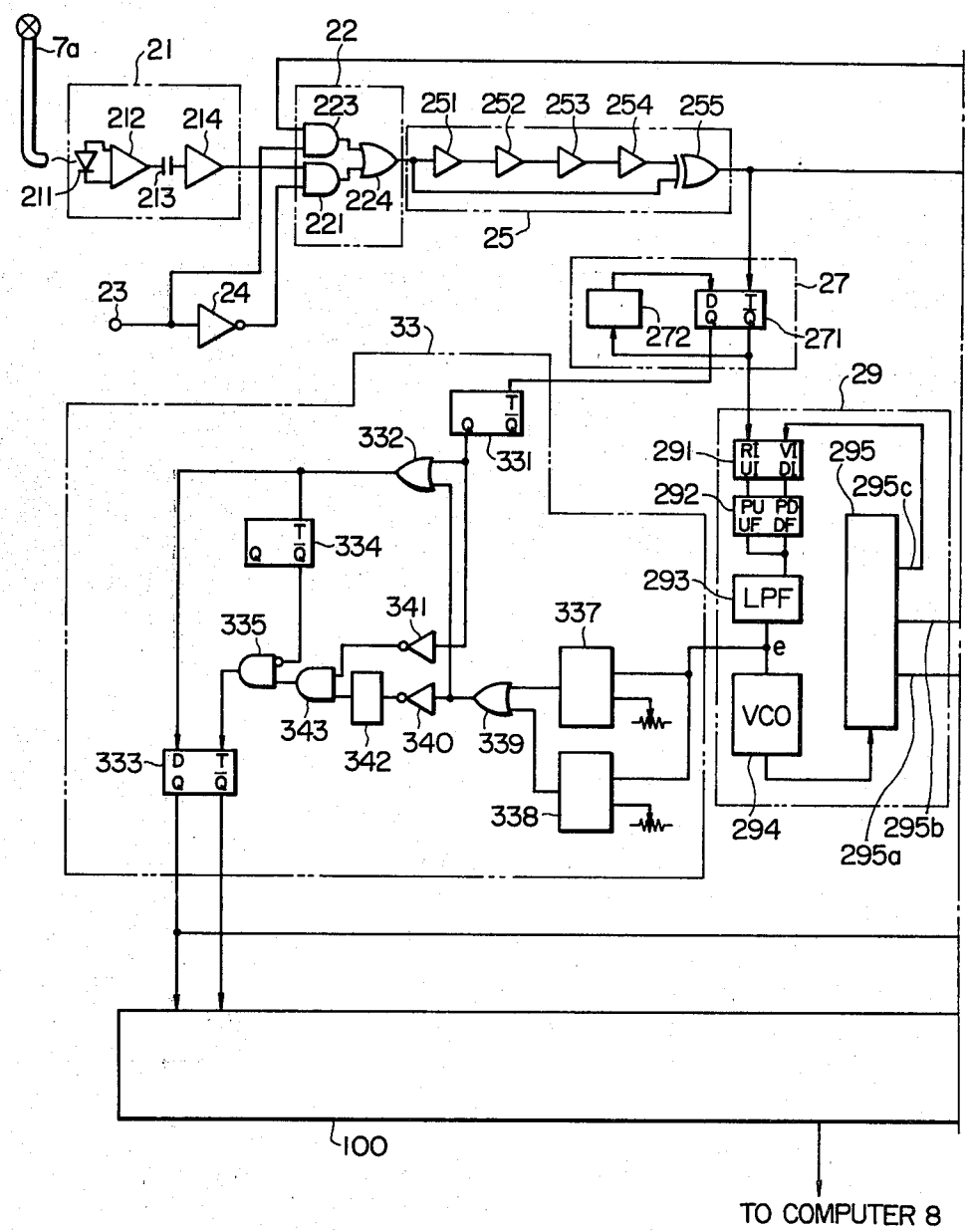
FIGS. 2(A) and 2(B) are schematic circuits diagrams of one of a plurality of stations in the loop type data highway system shown in FIG. 1.
Figure 2B:
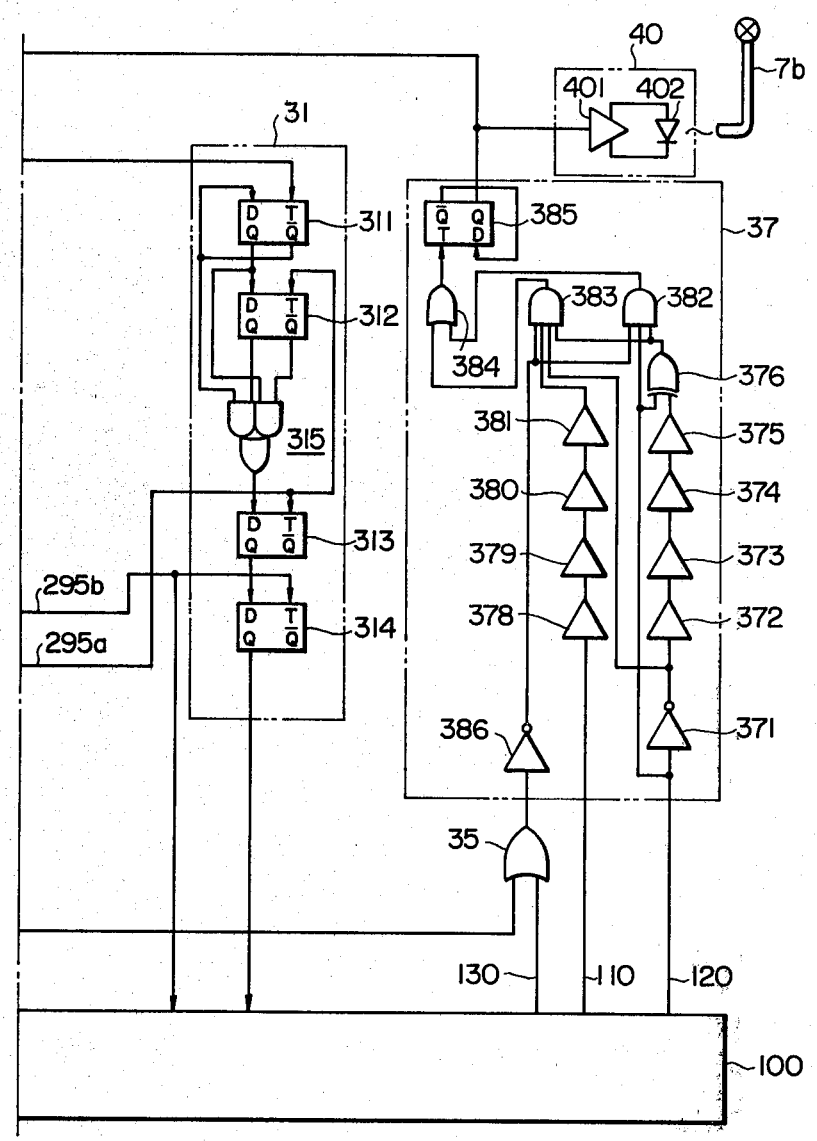
Figure 4:
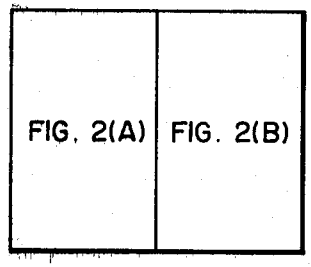
FIG. 4 is a diagram showing the relationship between FIGS. 2(A) and 2(B)
Figure 5:
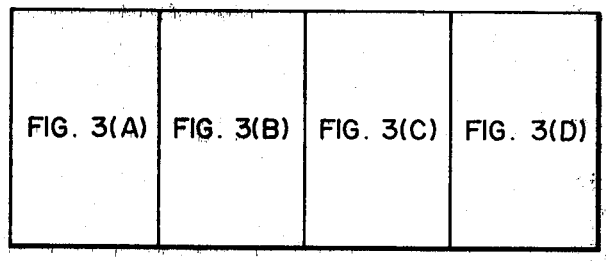
FIG. 5 is a diagram showing the relationship among FIGS. 3(A) to 3(D).

FIGS. 2(A) and 2(B) are a block diagram showing the construction of the station 1 of the highway system shown in FIG. 1. FIGS. 2(A) and 2(B) are correlated in the manner shown in FIG. 4. The respective stations of the present invention are basically made to have an identical construction. Here, one station to become a key station is equipped with a clock signal oscillator which provides the basis for transmitting and receiving data on the highway system, whereas the remaining stations are not equipped with such oscillator but extract a timing signal from the signals received so that a clock signal is prepared on the basis of the timing signal by the phase locked loop. It is quite natural that even the key station is identical to the remaining stations in that it is equipped with the phase locked loop for reception.

The operations of the stations will be described in the following with reference to the time charts shown in FIGS. 3(A) to 3(D). Indicated at letters SS in FIG. 3 is a transmission signal to be transmitted by one of the other stations. As exemplified in FIG. 3, the signal "1" and the signal "0" are made to correspond to a high level "H" and a low level "L", respectively. Letters SW indicate the signal waveform, in which the transmission signal is modulated for transmission. Although the modulating system may be of any type in the present invention, the signal "1" in the illustrated example is changed during the period of the signal "1" either from the high level to the low level or from the low level to the high level, whereas the signal "0" continues either at the high level or at the low level during the period of the signal "0". At the changing point of each signal, the level of the signal waveforms never fails to be changed. Numerals 7a and 7b show a part of the common bus 7. The embodiment shown corresponds to an example in which the common bus 7 is an optical fiber. From the common bus 7a, there is attained a received wavefrom RW which has a distorted shape of the signal waveform SW.

Indicated at numeral 21 is a receiver, which is composed of a light receiving diode 211 for converting the input signal, which is optically fed from the fiber 7a, into an electric signal, a first amplifier 212 for amplifying the output of the diode 211, and a coupled condenser 213 for introducing that output into a second amplifier 214, thus producing the reception signal RS from the received waveform RW. Indicated at numeral 22 is an input signal control gate, which is constructed of AND gates 221 and 222 and an OR gate 223 for receiving the outputs of the AND gates 221 and 222 as its input. One of the input terminals of the AND gates 221 and 223 receives the signal, which is fed to a test signal terminal 23, at one gate 221 in an inverted form via inverter 24 and at the other gate 223 directly. As a result, at a normal state (when no signal is applied to the test signal terminal 23), the reception signal from the common bus 7a is introduced through the AND gate 221. Upon inspection of the stations (when the test signal is fed to the test signal terminal 23), the transmission signal of one station is fed as its reception signal through the AND gate 223, as will be described hereinafter. Indicated at numeral 25 is a differential circuit, which is constructed of four series-connected buffer amplifiers 251 to 254 and one exclusive OR gate 255. Since the output of the OR gate 224 is fed partly through the amplifiers 251 to 254 and partly in a direct manner to the exclusive OR gate 255, there is established at this exclusive OR gate 255 a pulse output, which has a width corresponding to the delay time by the buffer amplifiers 251 to 254, only when the signal received is changed. In other words, a signal equivalent to that which is produced when the reception signal is differentiated is generated. Indicated at numeral 27 is a timing signal extracting circuit, which is composed of a flip-flop 271 and a delay circuit 272. When the flip-flop 271 has its input terminal D changing in its level in a manner to correspond to the application of a trigger pulse to an input terminal T, its output terminal level is changed to the high or low level upon reception of the trigger pulse at the trigger terminal T. When the level of the signal fed to the input terminal of the delay circuit 272 is changed, the level of the output terminal becomes the same as that of the input terminal after a predetermined time (which corresponds to three fourths of the duration of the signals "1" and "0" in the embodiment of the present invention) has elapsed.

As a result, if the output 25S of the differential circuit 25 is fed to the terminal T of the flip-flop 271, there is generated at a terminal Q such a waveform as alternately repeats the high and low levels during the same duration as that of the transmission signal "1" or "0", as indicated at 27S. Indicated at numeral 29 is a phase locked loop, in which a phase comparator 291, a charge pump circuit 292, a low-pass filter 293, a voltage controlled oscillator 294 and a counter 295 are consecutively connected in a loop. The phase comparator 291 has its reference input terminal RI connected to receive the output of the terminal $\overline{Q}$ of the flip-flop 271 and its varying input terminal VI receives the output of the terminal 295C of the counter 295. The circuit 291 generates its output at terminals UI and DI in accordance with the advancement of the rise of the signal to be applied to the terminals RI and VI. In the embodiment as shown, when the output RI rises faster than the output VI, an output is generated at the terminal UI for the time difference. When the output VI rises faster than the output RI, on the other hand, an output is generated at the terminal DI for the time difference. The outputs of the terminals UI and DI of the phase comparator 291 are fed to the input terminals PU and PD of the charge pump circuit 292. The circuit 292 has its output terminals UF and DF connected together and further to the input terminal of the low-pass filter 293. Thus, the charge pump circuit 292 operates in such a way that the output voltage e of the low-pass filter 293 is increased when there is an input at the input terminal PU of the circuit 292 and that the voltage e is decreased when there is an input at the input terminal PD. The voltage controlled oscillator 294 oscillates at a frequency of the level corresponding to the voltage of the low-pass filter 293. The counter 295 receives the output of the voltage controlled oscillator 294 thereby to divide the frequency of that output. In the embodiment as shown, the counter 295 has its outputs 295a, 295b and 295c made to consecutively divide the input signal into $\frac{1}{8}$, $\frac{1}{2}$ and $\frac{1}{4}$ frequencies. At a state in which the stations are stably operating, the output terminal $\overline{Q}$ of the flip-flop 271 and the terminal 295c of the counter 295 are in synchronism with each other so that a hair-shaped output (substantially no output) is fed out of the phase comparator 291. The waveforms 29S of the phase locked loop 29 have their major portions shown, respectively. Indicated at numeral 31 is a demodulator such as a well-known differential demodulator which is constructed of flip-flops 311 to 314 and an exclusive OR circuit 315. The waveforms of this demodulator are indicated at 31S and have their major portions shown, respectively. Since the operations of the demodulator itself have no direct relationship with the present invention, their detailed explanations are omitted here. For the operations of the demodulator, however, the clocks 295a and 295b, which are generated by the phase locked loop, are used. The clock 295b is used as the reference clock for controlling the stations. Thus, at the output terminal Q of the flip-flop 314, there is generated a transmission signal SS, as indicated at 314Q in the drawing, after a time lapse required for the delay for the transmission and the demodulation. Both the clock 295b and the output 314Q are introduced into a control circuit 100. This control circuit 100 receives both the ready signal, which signifies the signal normality by a later-described signal monitoring circuit 33, and an abnormal signal.

Although the foregoing description has been made for the phenomena when the signal transmission is normally performed, the phenomena in which the common bus 7a is broken so that the signals are not correctly received will be described in the following. Numeral 33 indicates a received signal monitoring circuit. Indicated at numeral 331 is a re-triggerable one-shot multivibrator, which has its trigger terminal T connected with the terminal Q of the flip-flop 271. The one-shot multivibrator 331 is so set that its terminal Q takes the low level whereas its terminal $\overline{Q}$ takes the high level when it is triggered. When the one-shot multivibrator has its terminal T fed repeatedly with the rising input of the pulses for a shorter period than a preset time $T_0$, its output terminals Q and $\overline{Q}$ are held at the low and high levels, respectively. On the other hand, when the one-shot multivibrator is fed with no rising input of the pulses for a period exceeding the aforementioned predetermined time $T_0$, its output terminals Q and $\overline{Q}$ have their levels inverted so that the terminal Q takes the high level whereas the terminal $\overline{Q}$ takes the low level. As a result, when no signal is received at a time $t_1$ indicated at FIG. 3(A), the output terminal Q of the multivibrator 331 does not take the high level until the time $t_2$ at the end of the period $T_0$ after the time $t_0$ when the output Q of the flip-flop 271 last rose to the high level. This change to the high level is transmitted through an OR gate 332 to the input terminal D of a flip-flop 333 so that the output Q of the flip-flop 333 takes the high level. Since the fact that the output terminal Q is at the high level represents an abnormality of the receiving condition, as has been indicated, the high level signal is introduced into the control circuit 100 thereby to stop the DATA processing in the stations, although not shown. At the same time, the high level signal is transmitted through an OR gate 35 to a demodulator 27 thereby to stop the DATA transmission to the data highway in the downstream direction, as will be described hereinafter, so that the system is prevented from being operated in an abnormal state. Indicated at numeral 334 is a one-shot multivibrator, the output terminal $\overline{Q}$ of which takes the high level for a predetermined period $T_1$ when the trigger terminal T receives the rising input of the applied pulses. Since this high level output is fed to the prohibition signal input terminal of an AND circuit 335, the output of this circuit 335 is held unconditionally at the low level for the period $T_1$ once the input signal interruption is detected. Indicated at numerals 337 and 338 are level detectors, each of which is fed with the output voltage of the low-pass filter 293. The level detector 337 generates its output at the high level when the output voltage e of the low-pass filter 293 is increased to exceed a predetermined level as an upper limit. On the other hand, the level detector 338 generates its output at the high level when the voltage e is decreased to a lower level than a predetermined level as a lower limit. The outputs of the level detectors 337 and 338 are connected through an OR gate 339 with the OR gate 332. As a result, the output voltage of the low-pass filter 293 is applied, when it exceeds a predetermined range, to the flip-flop 333 in a similar manner to that when the reception interruption is detected, thereby to make it possible to judge that the receiving state is abnormal.

Since inverters 340 and 341 are made receptive of the output of the OR gate 339 and the output Q of the one-shot multivibrator 331, they respectively generate outputs at the high level when the output of the OR gate 339 and the output Q of the multivibrator 331 are at the low level. Indicated at numeral 342 is a timer which is operative to delay the input for a predetermined period $T_3$. Indicated at numeral 343 is an AND gate, which receives the outputs of the timer 342 and the inverter 341 so that its output is fed to the AND gate 335. As a result, since the flip-flop 333 has its output terminal $\overline{Q}$ reaching the high level on condition that the output $\overline{Q}$ of the one-shot multi-vibrator 334 is at the low level and that the output of the AND gate 343 is at the high level, the output terminal $\overline{Q}$ of the flip-flop 333 takes the high level so that the flip-flop 333 is brought into such a ready state that it can perform its normal reception. The high level signal of that flip-flop 333$\overline{Q}$ is applied to the control circuit 100 so that it is used as the signal for allowing the transmission and reception of signals.

Figure 3A:
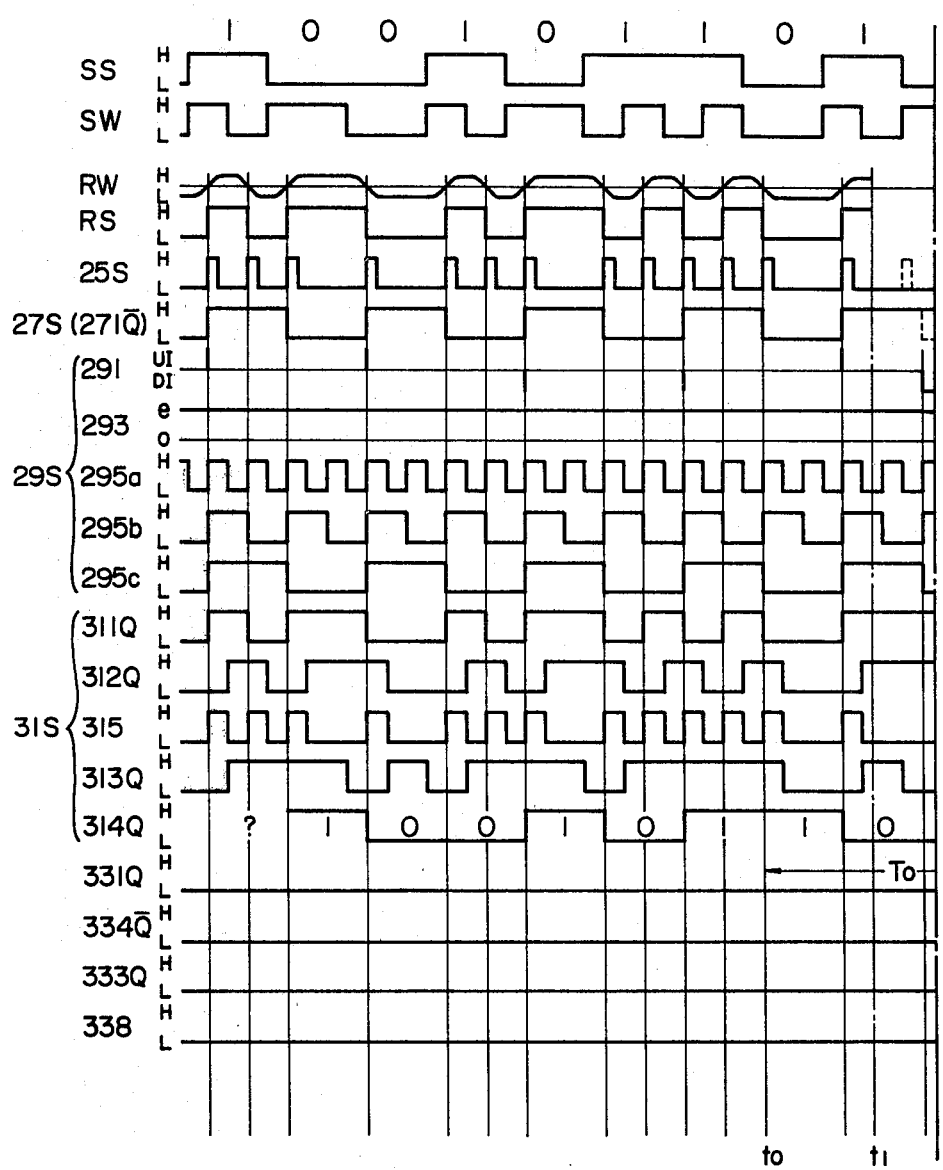
FIGS. 3(A) to 3(D) are time charts showing the operation state of some part in the station shown in FIGS. 2(A) and 2(B)
Figure 3B:
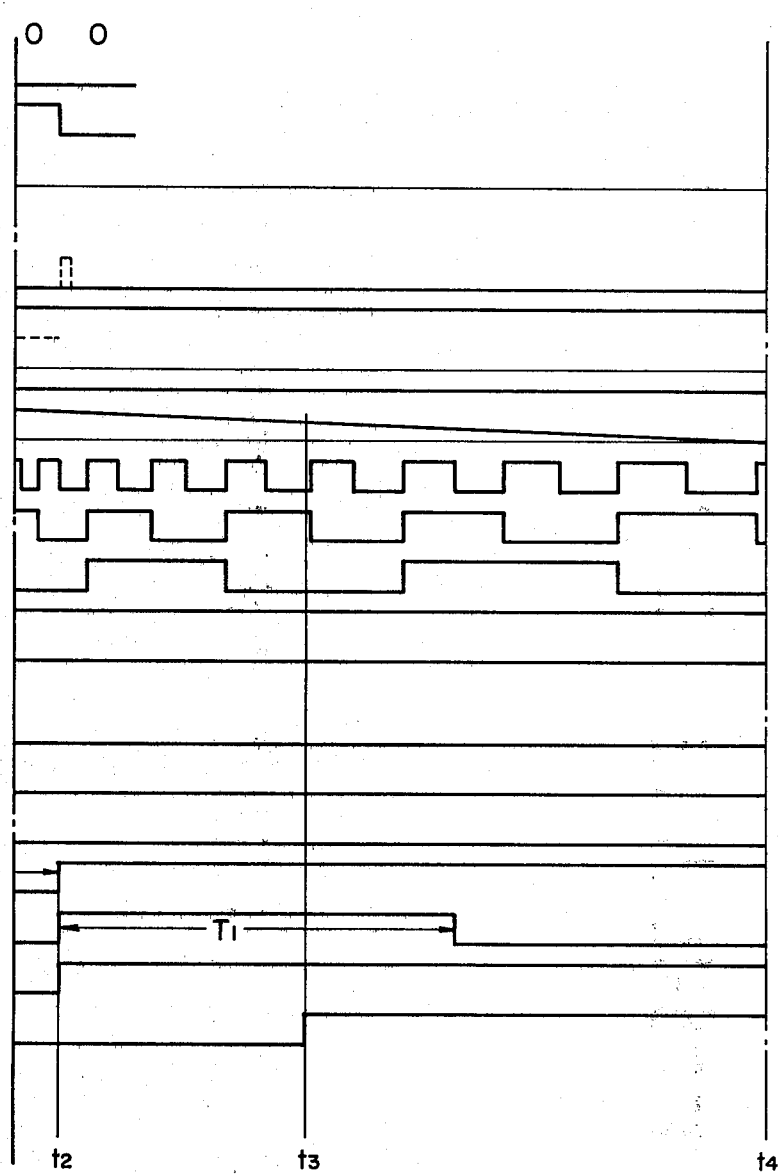
Figure 3C:
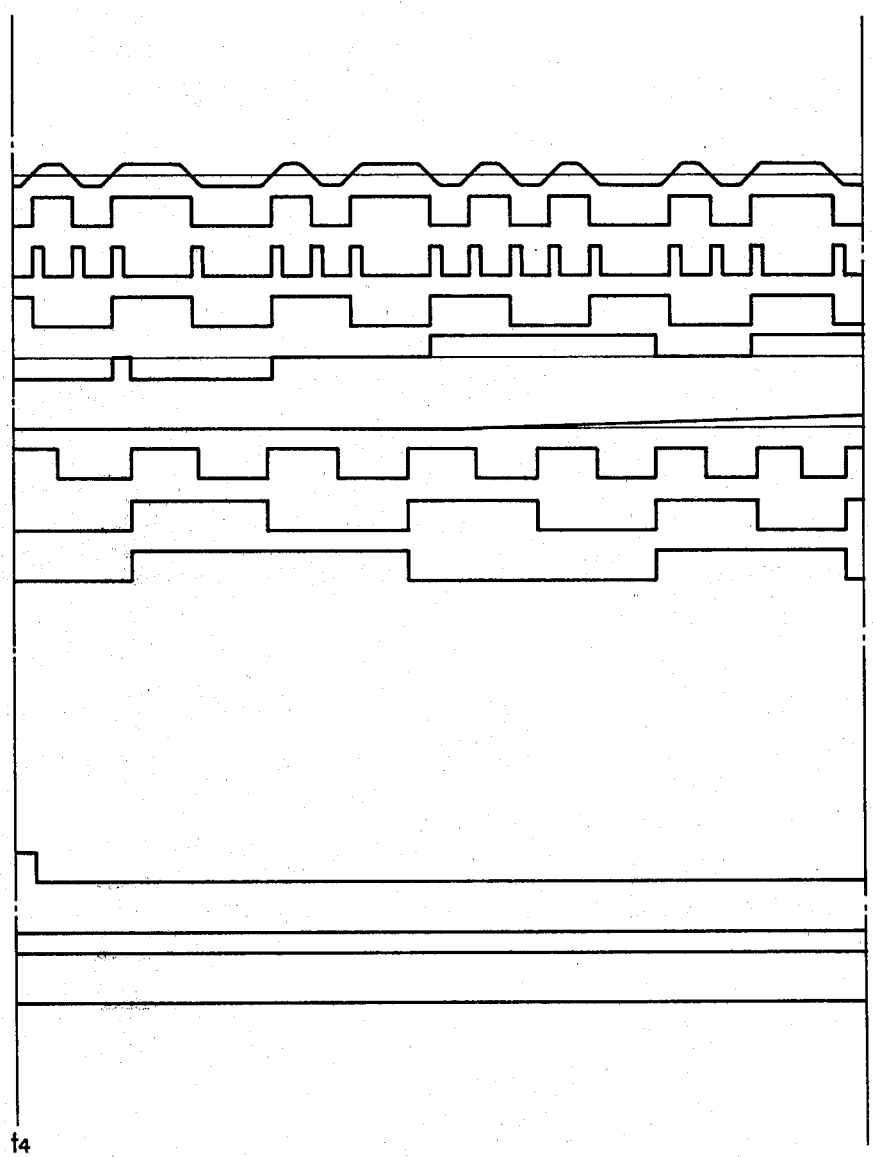
Figure 3D:
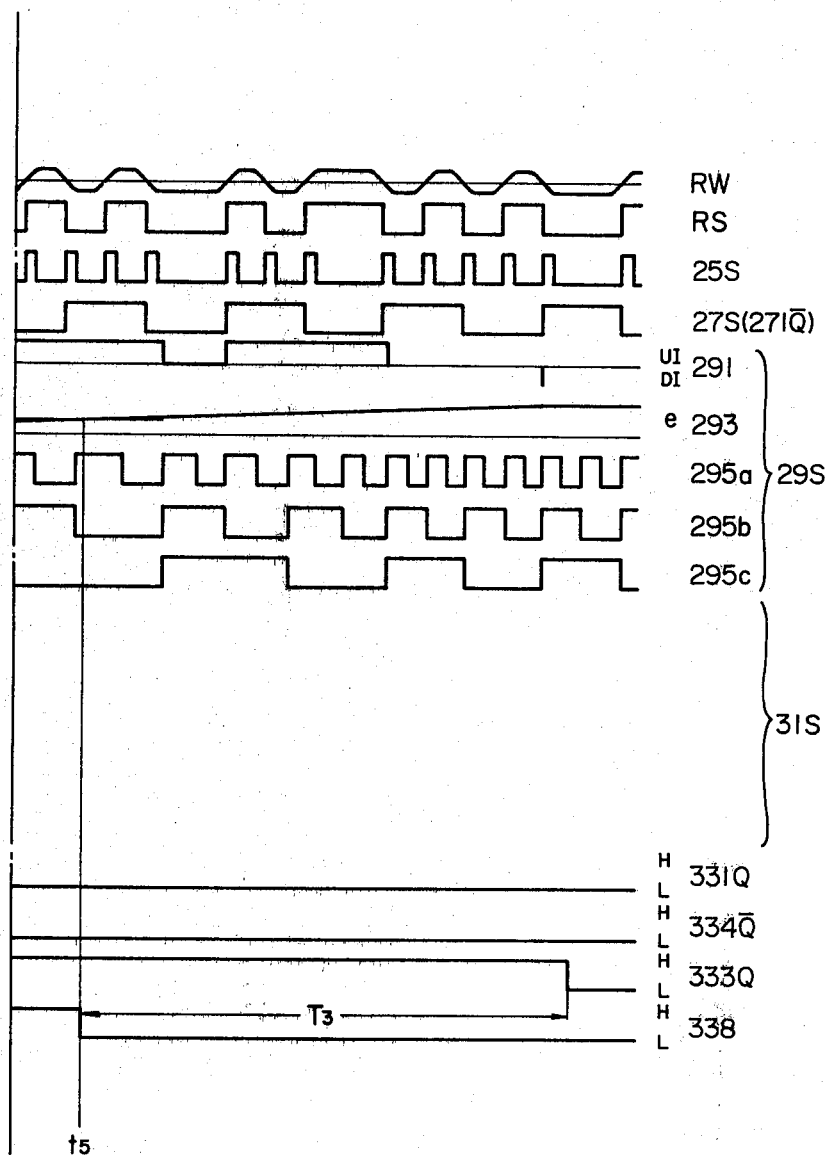

FIGS. 3(A) and 3(B) are time charts showing the transit state from the normal receiving state to the abnormal state due to the signal interruption and indicate that the judgement of the abnormality can be performed at the time $t_2$ by the reception interruption which occurred at the time $t_1$. The time $t_3$ is the time when the output of the low pass filter of the phase locked loop 29 is decreased to a lower level than the lower limit. FIG. 3(C) is a time chart showing the state after the time $t_4$ when the signal starts to be received after the reception interruption. FIG. 3(D) is a time chart showing the ready state at which the normal reception can be performed. During the time period between FIGS. 3(B) and 3(C), the phase locked loop oscillates with an oscillatory frequency intrinsic to itself. In FIG. 3(C), the waveforms of the demodulator 31 are omitted. Since there is a possibility that the amplifier of the receiver 21 will oscillate after the elapse of a short time from the time $t_1$, e.g., around the time $t_3$, this exerts no direct influence on the fact that the phase locked loop 29 operates with the free run frequency. In order to simplify the drawing, therefore, the waveforms of the received signal RS are omitted for the period between the times $t_1$ to $t_4$. This similarly applies to not only the received waveforms RW but also the waveforms SS and SW at the transmission side.

A brief description will be made of the demodulator 37. The transmission DATA, the clock signal and the transmission prohibition signal are fed out the control circuit 100 through conducting lines 110, 120 and 130. The transmission prohibition signal (as appearing at the line 130) is generated at the high level, when the transmission is to be interrupted by a cause other than the abnormality in the signal received, and is applied to the OR gate 35. As the DATA to be transmitted (as appearing on the line 110), the output 314Q of the flip-flop 314 is used as it is unless the station does not feed out its intrinsic DATA. For example, when the signal of the computer 8 is to be independently transmitted, it is used as the transmission DATA. This selection is performed by the control circuit 100. The output 295b of the counter 295 is used as the clock signal (as appearing on the line 120). The demodulator 37 is constructed of the following circuits: an inverter 371 connected to receive the clock signal; buffer amplifiers 372 to 375 connected in series to the output of the inverter 317; buffer amplifiers 378 to 381 connected in series to receive the transmission DATA; an inverter 386 connected to the output of the OR gate 35; an exclusive OR gate 376 connected to receive both the clock signal and the output of the buffer amplifier 375; the AND gate inverter 371 connected to receive the clock signal and the outputs of the exclusive OR gate 376 and the inverter 386; an AND gate connected to the outputs of the buffer amplifier 381 and the inverter 386; an OR gate 384 connected to the outputs of AND gates 382 and 383; and a flip-flop 385 adapted to be triggered by the output of the OR gate 384. Since the circuit thus constructed is well known as a differential modulating system, its detailed description is omitted here. For brief description, the changing point of the exclusive OR gate 376 is detected so that the flip-flop 385 is triggered in accordance with the high and low levels of the transmission DATA at that time thereby to generate the transmission waveforms SW, as shown in FIG. 3. When the OR gate 35 generates its output at the high level, i.e., either when the output 333 Q of the flip-flop 333 of the reception signal monitoring circuit 33 is at the high level or when the transmission prohibition signal is fed out of the control circuit 100, the output of the inverter 386 takes the low level thereby to force the outputs of the AND gates 382 and 383 take the low level so that the transmission is interrupted.

The transmission signal is introduced into a transmission circuit 40, in which it is converted into an optical signal by the actions of an amplifier 401 and a light emitting element 402 until it is fed to the transmission line 7b. On the other hand, the transmission signal is further introduced into the AND gate 223.

When, at the time $t_4$, the input signal starts to be received so that it has such a frequency component as can effect the synchronous extraction of the phase locked loop, the period, for which the signal UI in the direction to increase the oscillatory frequency of the phase locked loop is fed out of the phase comparator 292, is so elongated that the output voltage e of the low-pass filter is increased. At the time $t_5$, the output of the level detector 338 is changed from the high level to the low level (whereas the level detector 337 has a low level output from the initial time) so that the inverter 340 takes the high level output. As a result, after the elapse of the period $T_3$, the timer 342 generates its high level output.

Since the fact that the input signals have periodicity is detected by the re-triggerable one-shot multivibrator 331, the output 331Q thereof naturally takes the low level, and the inverter 341 generates the high level output so that the AND gate 343 generates the high level output, too. Since the output 334$\overline{Q}$ of the one-shot multivibrator 334 is at the low level, the output of the AND gate 335 takes the high level, and the flip-flop 333 is triggered to have its output $\overline{Q}$ at the high level so that the stations are rendered receptive while releasing the transmission prohibition.

Here, the period $T_3$ is not necessarily indispensable. However, since the fact that the output of the level detector 338 takes the low level merely implies the substantially synchronous extractable state, the period $T_3$ is set, while taking the time constant of the phase locked loop into consideration, so that the start of the transmission and reception may be awaited until a more completely synchronous state is reached.

As has been described hereinbefore, according to the present invention, once the input signal interruption is detected, this input signal interruption state is held until the phase locked loop deviates from its synchronous state so that the interruption of the transmission is held even if the receiver oscillates, and the transmission is not reopened before the phase locked loop is not at its substantially synchronous state so that the abnormal operation accompanying the input signal interruption can be prevented without any fail.

What we claim is:

1. A looped highway system for data transmission, comprising: a plurality of stations connected in series through a common bus to form a closed loop, in which data transmission between apparatus connected with said stations is carried out through the corresponding stations, wherein each of said stations includes a receiver and a transmitter;

wherein one of said stations includes means for generating a clock signal, while the remaining stations include means having a phase locked loop for deriving the clock signal out of the data which has been received through the receiver therein;

each of said remaining stations including first monitor means for detecting that the data received through the receiver thereof has lost a predetermined periodicity, and second monitor means for detecting that said phase locked loop is at its synchronous state, and control means responsive to the output of said first monitor means for interrupting the feed of the data therefrom to the adjoining station from the transmitter thereof for a predetermined time period and for allowing the feed of data to said highway on condition that said predetermined time period has elapsed and that said second monitor means provides an output indicating that said phase locked loop is at its synchronous state.

2. A looped highway system for data transmission according to claim 1, wherein said predetermined time period is longer than the period of time from the time when said first monitor means generates its output in response to the data having lost its predetermined periodicity to the time when said second monitor means loses its output.

3. A looped highway system for data transmission according to claim 1, wherein the output of said first monitor means is made effective when the output of said second monitor means continues for said predetermined time period.

4. A looped highway system for data transmission according to claim 1, wherein said remaining stations each include modulation-demodulation means for demodulating the data received from said receiver and modulating the data applied to said transmitter, bypass means for supplying the data from the receiver output to said modulation-demodulation means thereof, and gate means for selecting either the output of said bypass means or the output of said receiver to be applied to said modulation-demodulation means.

* * * * *